US008834587B2

United States Patent
Cortright et al.

(10) Patent No.: US 8,834,587 B2
(45) Date of Patent: Sep. 16, 2014

(54) METHOD OF PRODUCING GASEOUS PRODUCTS USING A DOWNFLOW REACTOR

(75) Inventors: Randy D. Cortright, Madison, WI (US); Robert T. Rozmiarek, Middleton, WI (US); Charles C. Hornemann, Madison, WI (US)

(73) Assignee: Virent, Inc., Madison, WI (US)

( * ) Notice: Subject to any disclaimer, the term of this patent is extended or adjusted under 35 U.S.C. 154(b) by 0 days.

(21) Appl. No.: 13/539,861

(22) Filed: Jul. 2, 2012

(65) Prior Publication Data

US 2012/0282163 A1    Nov. 8, 2012

Related U.S. Application Data

(62) Division of application No. 11/961,280, filed on Dec. 20, 2007, now abandoned.

(60) Provisional application No. 60/876,015, filed on Dec. 20, 2006.

(51) Int. Cl.
| | | |
|---|---|---|
| *C01B 6/24* | (2006.01) | |
| *C01B 3/00* | (2006.01) | |
| *B01J 8/06* | (2006.01) | |
| *C01B 3/32* | (2006.01) | |
| *B01J 8/02* | (2006.01) | |

(52) U.S. Cl.
CPC ........ B01J 8/025 (2013.01); *B01J 2208/00212* (2013.01); *B01J 2208/00672* (2013.01); *B01J 2208/00539* (2013.01); B01J 8/067 (2013.01); *C01B 2203/0805* (2013.01); *C01B 2203/84* (2013.01); *C01B 2203/066* (2013.01); *B01J 2208/00221* (2013.01); *C01B 2203/0233* (2013.01); *C01B 2203/107* (2013.01); *C01B 2203/1064* (2013.01); *C01B 2203/1041* (2013.01); C01B 3/323 (2013.01); *B01J 2208/025* (2013.01); B01J 8/065 (2013.01); *C01B 2203/0833* (2013.01); *C01B 2203/1058* (2013.01); *B01J 2208/00504* (2013.01); *B01J 2208/0053* (2013.01); *C01B 2203/1211* (2013.01)

USPC ............ 48/197 R; 48/61; 423/644; 423/650; 423/651

(58) Field of Classification Search
CPC ................ C10J 3/26; B01J 14/00; B01J 8/12; B01J 8/003
USPC ........................................................ 48/197 R
See application file for complete search history.

(56) References Cited

U.S. PATENT DOCUMENTS

| 2,965,679 A | 12/1960 | Conradin et al. |
| 3,894,107 A | 7/1975 | Butter et al. |

(Continued)

FOREIGN PATENT DOCUMENTS

| CA | 1201080 A | 2/1986 |
| EP | 0204354 A1 | 12/1986 |

(Continued)

OTHER PUBLICATIONS

Yoshida et al., "Gasification of Cellulose, Xylan, and Lignin Mixtures in Supercritical Water" 2001 Ind. Eng. Chem. Res. 40:5469-5474.

(Continued)

*Primary Examiner* — Matthew Merkling
(74) *Attorney, Agent, or Firm* — Quarles & Brady LLP

(57) ABSTRACT

Reactor systems and methods are provided for the catalytic conversion of liquid feedstocks to synthesis gases and other noncondensable gaseous products. The reactor systems include a heat exchange reactor configured to allow the liquid feedstock and gas product to flow concurrently in a downflow direction. The reactor systems and methods are particularly useful for producing hydrogen and light hydrocarbons from biomass-derived oxygenated hydrocarbons using aqueous phase reforming. The generated gases may find used as a fuel source for energy generation via PEM fuel cells, solid-oxide fuel cells, internal combustion engines, or gas turbine gensets, or used in other chemical processes to produce additional products. The gaseous products may also be collected for later use or distribution.

19 Claims, 9 Drawing Sheets

(56) References Cited

U.S. PATENT DOCUMENTS

| | | |
|---|---|---|
| 4,013,734 A | 3/1977 | Kim |
| 4,223,001 A | 9/1980 | Novotny et al. |
| 4,380,679 A | 4/1983 | Arena |
| 4,380,680 A | 4/1983 | Arena |
| 4,382,150 A | 5/1983 | Arena |
| 4,401,823 A | 8/1983 | Arena |
| 4,456,779 A | 6/1984 | Owen et al. |
| 4,476,331 A | 10/1984 | Dubeck et al. |
| 4,487,980 A | 12/1984 | Arena |
| 4,496,780 A | 1/1985 | Arena |
| 4,503,274 A | 3/1985 | Arena |
| 4,541,836 A | 9/1985 | Derderian |
| 4,543,435 A | 9/1985 | Gould et al. |
| 4,554,260 A | 11/1985 | Pieters et al. |
| 4,642,394 A | 2/1987 | Che |
| 4,717,465 A | 1/1988 | Chen et al. |
| 4,828,812 A | 5/1989 | McCullen et al. |
| 4,885,421 A | 12/1989 | Harandi et al. |
| 4,919,896 A | 4/1990 | Harandi et al. |
| 4,935,568 A | 6/1990 | Harandi et al. |
| 5,001,292 A | 3/1991 | Harandi et al. |
| 5,006,131 A | 4/1991 | Karafian et al. |
| 5,019,135 A | 5/1991 | Sealock, Jr. et al. |
| 5,026,927 A | 6/1991 | Andrews et al. |
| 5,095,159 A | 3/1992 | Harandi et al. |
| 5,105,044 A | 4/1992 | Han et al. |
| 5,130,101 A | 7/1992 | Harandi et al. |
| 5,139,002 A | 8/1992 | Lynch et al. |
| 5,149,884 A | 9/1992 | Brenner et al. |
| 5,177,279 A | 1/1993 | Harandi |
| 5,214,219 A | 5/1993 | Casale et al. |
| 5,238,898 A | 8/1993 | Han et al. |
| 5,306,847 A | 4/1994 | Gehrer et al. |
| 5,326,912 A | 7/1994 | Gubitosa et al. |
| 5,344,849 A | 9/1994 | Ayasse |
| 5,354,914 A | 10/1994 | Gubitosa et al. |
| 5,496,786 A | 3/1996 | Gubitosa et al. |
| 5,504,259 A | 4/1996 | Diebold et al. |
| 5,543,379 A | 8/1996 | Gubitosa et al. |
| 5,578,647 A | 11/1996 | Li et al. |
| 5,600,028 A | 2/1997 | Gubitosa et al. |
| 5,616,154 A | 4/1997 | Elliott et al. |
| 5,616,817 A | 4/1997 | Schuster et al. |
| 5,635,145 A | 6/1997 | Den Hartog et al. |
| 5,651,953 A | 7/1997 | Yokoyama et al. |
| 5,660,602 A | 8/1997 | Collier, Jr. et al. |
| 5,666,923 A | 9/1997 | Collier, Jr. et al. |
| 5,787,864 A | 8/1998 | Collier, Jr. et al. |
| 5,817,589 A | 10/1998 | de Agudelo et al. |
| 5,861,137 A | 1/1999 | Edlund |
| 5,959,167 A | 9/1999 | Shabtai et al. |
| 6,054,041 A | 4/2000 | Ellis et al. |
| 6,059,995 A | 5/2000 | Topsoe et al. |
| 6,152,975 A | 11/2000 | Elliott et al. |
| 6,171,992 B1 | 1/2001 | Autenrieth et al. |
| 6,172,272 B1 | 1/2001 | Shabtai et al. |
| 6,207,132 B1 | 3/2001 | Lin et al. |
| 6,235,797 B1 | 5/2001 | Elliot et al. |
| RE37,329 E | 8/2001 | Gubitosa et al. |
| 6,280,701 B1 | 8/2001 | Autenrieth et al. |
| 6,291,725 B1 | 9/2001 | Chopade et al. |
| 6,323,383 B1 | 11/2001 | Tsuchida et al. |
| 6,361,757 B1 | 3/2002 | Shikada et al. |
| 6,372,680 B1 | 4/2002 | Wu et al. |
| 6,373,680 B1 | 4/2002 | Riskin |
| 6,387,554 B1 | 5/2002 | Verykios |
| 6,397,790 B1 | 6/2002 | Collier, Jr. |
| 6,413,449 B1 | 7/2002 | Wieland et al. |
| 6,429,167 B1 | 8/2002 | Maeno et al. |
| 6,440,895 B1 | 8/2002 | Tonkovich et al. |
| 6,479,428 B1 | 11/2002 | Tonkovich et al. |
| 6,479,713 B1 | 11/2002 | Werpy et al. |
| 6,486,366 B1 | 11/2002 | Ostgard et al. |
| 6,497,856 B1 | 12/2002 | Lomax, Jr. et al. |
| 6,508,209 B1 | 1/2003 | Collier, Jr. |
| 6,570,043 B2 | 5/2003 | Elliott et al. |
| 6,582,667 B1 | 6/2003 | Ogata et al. |
| 6,607,707 B2 | 8/2003 | Reichman et al. |
| 6,670,300 B2 | 12/2003 | Werpy et al. |
| 6,677,385 B2 | 1/2004 | Werpy et al. |
| 6,699,457 B2 | 3/2004 | Cortright et al. |
| 6,739,125 B1 | 5/2004 | Mulligan |
| 6,749,828 B1 | 6/2004 | Fukunaga |
| 6,762,149 B2 | 7/2004 | Tonkovich et al. |
| 6,765,101 B1 | 7/2004 | Bhasin et al. |
| 6,841,085 B2 | 1/2005 | Werpy et al. |
| 6,953,873 B2 | 10/2005 | Cortright et al. |
| 6,964,757 B2 | 11/2005 | Cortright et al. |
| 6,964,758 B2 | 11/2005 | Cortright et al. |
| 6,969,506 B2 | 11/2005 | Tonkovich et al. |
| 6,982,328 B2 | 1/2006 | Werpy et al. |
| 7,022,824 B2 | 4/2006 | Vanoppen et al. |
| 7,038,094 B2 | 5/2006 | Werpy et al. |
| 7,070,745 B2 | 7/2006 | Van Der Meer et al. |
| 7,186,668 B2 | 3/2007 | Werpy et al. |
| 7,199,250 B2 | 4/2007 | Werpy et al. |
| 7,232,935 B2 | 6/2007 | Jakkula et al. |
| 7,273,957 B2 | 9/2007 | Bakshi et al. |
| 7,288,685 B2 | 10/2007 | Marker |
| 7,297,814 B2 | 11/2007 | Yada et al. |
| 7,355,083 B2 | 4/2008 | Tuck et al. |
| 7,520,909 B2 | 4/2009 | Rogers |
| 7,578,927 B2 | 8/2009 | Marker et al. |
| 7,615,652 B2 | 11/2009 | Holladay et al. |
| 7,618,612 B2 | 11/2009 | Cortright et al. |
| 7,649,099 B2 | 1/2010 | Holladay et al. |
| 7,652,131 B2 | 1/2010 | Werpy et al. |
| 7,663,004 B2 | 2/2010 | Suppes et al. |
| 7,674,916 B2 | 3/2010 | Werpy et al. |
| 7,692,001 B2 | 4/2010 | Holcomb |
| 7,767,867 B2 | 8/2010 | Cortright |
| 2002/0172632 A1 | 11/2002 | Chou |
| 2003/0100807 A1 | 5/2003 | Shabtai et al. |
| 2003/0115792 A1 | 6/2003 | Shabtai et al. |
| 2003/0175561 A1 | 9/2003 | Lightner |
| 2005/0014635 A1 | 1/2005 | Zhou et al. |
| 2005/0064560 A1 | 3/2005 | Werpy et al. |
| 2005/0203195 A1 | 9/2005 | Wang et al. |
| 2005/0207971 A1* | 9/2005 | Cortright et al. ............... 423/657 |
| 2005/0244329 A1 | 11/2005 | Casanave et al. |
| 2006/0013759 A1 | 1/2006 | Jiang et al. |
| 2006/0024539 A1 | 2/2006 | Dumesic et al. |
| 2007/0123739 A1 | 5/2007 | Crabtree et al. |
| 2007/0135301 A1 | 6/2007 | Holcomb, Jr. |
| 2008/0216391 A1 | 9/2008 | Cortright et al. |
| 2008/0300434 A1 | 12/2008 | Cortright et al. |
| 2008/0300435 A1 | 12/2008 | Cortright et al. |
| 2009/0211942 A1 | 8/2009 | Cortright et al. |
| 2010/0008840 A1 | 1/2010 | Zhong et al. |
| 2010/0076233 A1 | 3/2010 | Cortright et al. |

FOREIGN PATENT DOCUMENTS

| | | |
|---|---|---|
| EP | 0323663 B2 | 9/1994 |
| EP | 1454671 A1 | 9/2004 |
| EP | 1724325 A1 | 11/2006 |
| FR | 2857003 A1 | 1/2005 |
| GB | 2097390 A | 11/1982 |
| JP | 2002220202 A | 8/2002 |
| JP | 2004344721 A | 12/2004 |
| JP | 2005510437 A | 4/2005 |
| WO | 9429013 A1 | 12/1994 |
| WO | 9910450 A1 | 3/1999 |
| WO | 9961369 A1 | 12/1999 |
| WO | 0200341 A2 | 1/2002 |
| WO | 03045841 A1 | 6/2003 |
| WO | 2004039918 A2 | 5/2004 |
| WO | 2004052813 A1 | 6/2004 |
| WO | 2005037423 A1 | 4/2005 |
| WO | 2006100584 A2 | 9/2006 |
| WO | 2006119357 A2 | 11/2006 |
| WO | 2007027832 A2 | 3/2007 |
| WO | 2007053705 A2 | 5/2007 |

(56) References Cited

FOREIGN PATENT DOCUMENTS

| WO | 2007075476 A2 | 7/2007 |
|----|---------------|--------|
| WO | 2007099161 A1 | 9/2007 |
| WO | 2008109877 A1 | 9/2008 |

OTHER PUBLICATIONS

United States Patent and Trademark Office, Office Action Summary and Detailed Action, U.S. Appl. No. 11/800,671, Dec. 26, 2008.
Applicant, Response to Restriction Requirement, U.S. Appl. No. 11/800,671, Jan. 26, 2009.
United States Patent and Trademark Office, Office Action Summary and Detailed Action, U.S. App. No. 11/800,671, Apr. 8, 2009.
Applicant, Response to Non-Final Office Action, U.S. Appl. No. 11/800,671, Aug. 10, 2009.
United States Patent and Trademark Office, Issue Notification, U.S. Appl. No. 11/800,671, Aug. 3, 2010.
United States Patent and Trademark Office, Office Action Summary and Detailed Action, U.S. Appl. No. 12/158,635, Jan. 4, 2011.
United States Patent and Trademark Office, Office Action Summary and Detailed Action, U.S. Appl. No. 12/044,837, Aug. 12, 2010.
United States Patent and Trademark Office, Interview Summary, U.S. Appl. No. 12/044,837, Oct. 28, 2010.
Applicant, Response to Non-Final Office Action, U.S. Appl. No. 12/044,837, Nov. 12, 2010.
Applicant, Supplemental Response to Non-Final Office Action, U.S. Appl. No. 12/044,837, Jan. 5, 2011.
United States Patent and Trademark Office, Office Action Summary and Detailed Action, U.S. Appl. No. 12/044,908, Aug. 12, 2010.
United States Patent and Trademark Office, Interview Summary, U.S. Appl. No. 12/044,908, Oct. 29, 2010.
Applicant, Response to Non-Final Office Action, U.S. Appl. No. 12/044,908, Nov. 12, 2010.
Applicant, Supplemental Response to Non-Final Office Action, U.S. Appl. No. 12/044,908, Jan. 5, 2011.
United States Patent and Trademark Office, Office Action Summary and Detailed Action, U.S. Appl. No. 12/044,876, Aug. 16, 2010.
United States Patent and Trademark Office, Interview Summary, U.S. Appl. No. 12/044,876, Oct. 28, 2010.
Applicant, Response to Non-Final Office Action, U.S. Appl. No. 12/044,876, Nov. 12, 2010.
Applicant, Supplemental Response to Non-Final Office Action, U.S. Appl. No. 12/044,876, Jan. 5, 2011.
United States Patent and Trademark Office, Office Action Summary and Detailed Action, U.S. Appl. No. 12/834,306, Sep. 17, 2010.
Applicant, Response to Non-Final Office Action, U.S. Appl. No. 12/834,306, Dec. 15, 2010.
PCT International Search Report, Application No. PCT/US2007/011062, Sep. 16, 2008.
PCT International Preliminary Report on Patentability, Application No. PCT/US2007/011062, Nov. 11, 2008.
European Patent Office, Examination Report, Application No. 07870663.7, Oct. 22, 2010.
Ukraine Patent Office, Office Action, Application No. a 2008 12327, 2010.
Republic of South Africa, Letters Patent, Patent No. 2008/09194, Dec. 30, 2009.
Intellectual Property Office of New Zealand, Examination Report, Application No. 572113, Jun. 4, 2010.
PCT International Search Report, Application No. PCT/US2006/048030, Dec. 27, 2007.
PCT Written Opinion, Application No. PCT/US2006/048030, Jun. 21, 2008.
State Intellectual Property Office of the People'S Republic of China, First Office Action (Translation), Application No. 200680048598.5, Jun. 11, 2010.
Applicant, Response to State Intellectual Property Office of the People's Republic of China First Office Action, Application No. 200680048598.5, Oct. 21, 2010 [includes AFD China Intellectual Property Law Office Oct. 22, 2010 letter; Quarles & Brady Oct. 13, 2010 letter; English version of Amended Claims].
State Intellectual Property Office of the People's Republic of China, Second Office Action (Translation), Application No. 200680048598.5, Jan. 10, 2011.
Patent Office of the Russian Federation, Office Action (Inquiry) of the State Examination, Applicaiton No. 2008127066, Nov. 15, 2010.
Ukraine Patent Office, Office Action, Application No. a 2008 09306, 2010.
Applicant, Response to Ukraine Patent Office Office Action, Application No. a 2008 09306, Dec. 2010 [includes Papula-Nevinpat Dec. 8, 2010 letter].
Ukraine Patent Office, Office Action, Application No. a 2008 09306, Jan. 2011.
Intellectual Property Office of New Zealand, Examination Report, Application No. 569246, Mar. 2, 2010.
PCT International Search Report and Written Opinion, Application No. PCT/US2007/088417, Dec. 2, 2008.
PCT International Preliminary Report on Patentability, Application No. PCT/US2007/088417, Jun. 24, 2009.
Intellectual Property Office of New Zealand, Examination Report, Application No. 577547, Sep. 17, 2010.
Republic of South Africa, Letters Patent, Patent No. 2009/04056, Apr. 28, 2010.
PCT International Search Report, Application No. PCT/US2008/056330, Jul. 10, 2008.
PCT International Preliminary Report on Patentability, PCT/US2008/056330, Sep. 8, 2009.
European Patent Office, Communication, Application No. 08731758.2, Apr. 2, 2009.
Applicant, Response to European Patent Office Apr. 2, 2009 Communication, Application No. 08731758.2, May 1, 2009.
European Patent Office, Communication, Application No. 08731758.2, Mar. 25, 2010.
Applicant, Response to European Patent Office Mar. 25, 2010, Communication, Application No. 08731758.2, Oct. 1, 2010.
Intellectual Property Office of New Zealand, Examination Report, Application No. 579525, Sep. 29, 2010.
Republic of South Africa, Letters Patent, Patent No. 2009/05916, Apr. 28, 2010.
PCT International Search Report and Written Opinion, Application No. PCT/US2010/040644, Feb. 4, 2011.
Agar, Abstract 2254—Influence of the Liquid Phase Physical Properties on Unsteady-State Hydrodynamics in Periodically Operated Trickle-Bed Reactors, European Congress of Chemical Engineering—6, Copenhagen, Sep. 16-21, 2007.
Gayubo, et al., Transformation of Oxygenate Components of Biomass Pyrolysis Oil on a HZSM-5 Zeolite. I. Alcohols and Phenols, Ind. Eng. Chem. Res., 2004, 43(11):2610-2618.
Gayubo, et al., Transformation of Oxygenate Components of Biomass Pyrolysis Oil on a HZSM-5 Zeolite. II. Aldehydes, Ketones, and Acids, Ind. Eng. Chem. Res., 2004, 43(11):2619-2626.
Badger, "Ethanol From Cellulose: A General Review," 2002 J. Janick and A. Whipkey (eds.), Trends in New Crops and New Uses, ASHA Press, Alexandria, VA, pp. 17-21.
Bardin, et al., "Acidity of Keggin-Type Heteropolycompounds Evaluated by Catalytic Probe Reactions, Sorption Microcalorimetry, and Density Functional Quantum Chemical Calculations" 1998 J. Phys. Chem. B 102:10817-10825.
Barrett, et al., "Single-Reactor Process for Sequential Aldol-Condensation and Hydrogenation of Biomass-Derived Compounds in Water," 2006 Applied Catalysis B: Environmental 66:111-118.
Brown, et al., "Carbon-Halogen Bond Scission and Rearrangement of Beta-Halohydrins on the Rh(111) Surface" 1994 J. Phys. Chem. 98:12737-12745.
Chaminand, et al., "Glycerol Hydrogenolysis on Heterogeneous Catalysts", 2004 Green Chemistry 6:359-361.
Chen, et al., "Liquid Fuel From Carbohydrates," Aug. 1986 Chemtech pp. 506-509.
Chiu, et al., "Distribution of Methanol and Catalysts Between Biodiesel and Glycerin Phases" 2005 AIChE Journal 51:1274-1278.

(56) References Cited

OTHER PUBLICATIONS

Chiu, et al., "Removal of Residual Catalyst from Simulated Biodiesel's Crude Glycerol for Glycerol Hydrogenolysis to Propylene Glycol" 2006 Ind. Eng. Chem. Res. 45:791-795.
Corma, et al., "Processing Biomass-Derived Oxygenates in the Oil Refinery: Catalytic Cracking (FCC) Reaction Pathways and Role of Catalyst," 2007 Journal of Catalysis 247:307-327.
Cortright, et al., "Hydrogen from Catalytic Reforming of Biomass-Derived Hydrocarbons in Liquid Water" 2002 Nature 418:964-967.
Crabtree, et. al., "Novel Catalysis for Glycol Manufacture", 2001.
Dasari, et al., "Low-Pressure Hydrogenolysis of Glycerol to Propylene Glycol" 2005 Applied Catalysis A: General 281:225-231.
Dass, et al., "A Comparative Study of the Conversion of Ethanol and of Ethylene Over the 'Mobil' Zeolite Catalyst, H-ZSM-5. An application of the Benzene Sequestration Test," 1989 Can. J. Chem. 67:1732-1734.
Davda, et al., "A Review of Catalytic Issues and Process Conditions for Renewable Hydrogen and Alkanes by Aqueous-Phase Reforming of Oxygenated Hydrocarbons Over Supported Metal Catalysts" 2005 Applied Catalysis B: Environmental 56:171-186.
Davda, et al., "Aqueous-Phase Reforming of Ethylene Glycol on Silica-Supported Metal Catalysts" 2003 Applied Catalysis B: Environmental 43:13-26.
Davda, et al., "Catalytic Reforming of Oxygenated Hydrocarbons for Hydrogen with Low Levels of Carbon Monoxide" 2003 Angew. Chem. Int. Ed., 42:4068-4071.
Davda, et al., "Renewable Hydrogen by Aqueous-Phase Reforming of Glucose" 2004 Chem. Commun., pp. 36-37.
Dos Santos, et al., "Performance of RuSn Catalysts Supported on Different Oxides in the Selective Hydrogenation of Dimethyl Adipate," 2005 Catalysis Today 107-108:250-257.
Elliott, et al., "Chemical Processing in High-Pressure Aqueous Environments. 7. Process Development for Catalytic Gasification of Wet Biomass Feedstocks" 2004 Ind. Eng. Chem. Res. 43:1999-2004.
Elliott, et al.. "Chemical Processing in High-Pressure Aqueous Environments. 6. Demonstration of Catalytic Gasification for Chemical Manufacturing Wastewater Cleanup in Industrial Plants" 1999 Ind. Eng. Chem. Res. 38:879-883.
Elliott, et al., "Liquid Fuels by Low-Severity Hydrotreating of Biocrude," 1996 Developments in Thermochemical Biomass Conversion 1:611-621.
Fraser, "Roadmap for Cellulosic Ethanol Production," U.S. Department of Energy, Jun. 2006.
Fukuoka, et al., "Catalytic Conversion of Cellulose into Sugar Alcohols," 2006 Angew. Chem. Int. Ed. 45:5161-5163.
Greer, "Creating Cellulosic Ethanol: Spinning Straw into Fuel," May 2005 eNews Bulletin.
Huber, et al., "Production of Liquid Alkanes by Aqueous-Phase Processing of Biomass-Derived Carbohydrates" 2005 Science 308:1446-1450.
Huber, et al., "Raney Ni-Sn Catalyst for H2 Production from Biomass-Derived Hydrocarbons," 2003 Science 300:2075-2077.
Huber, et al., "Renewable Alkanes by Aqueous-Phase Reforming of Biomass-Derived Oxygenates" 2004 Angew. Chem. Int. Ed., 43:1549-1551.
Huber, et al., "Synthesis of Transportation Fuels from Biomass: Chemistry, Catalysts, and Engineering" 2006 Chem. Rev. 106:4044-4098.
Kawai, et al., "Production of Hydrogen and Hydrocarbon From Cellulose and Water" 1981 Chemistry Letters pp. 1185-1188.
Kluson, et al. "Selective Hydrogenation over Ruthenium Catalysts" 1995 Applied Catalysis A: General 128:13-31.
Makarova, et al., "Dehydration of n-Butanol on Zeolite H-ZSM-5 and Amorphous Aluminosilicate: Detailed Mechanistic Study and the Effect of Pore Confinement" 1994 Journal of Catalysis 149:36-51.
Minowa, et al., "Hydrogen Production from Cellulose in Hot Compressed Water Using Reduced Nickel Catalyst: Product Distribution at Different Reaction Temperatures" 1998 J. of Chem. Eng. of Japan 31:488-491.
Minowa, et al., "Hydrogen Production from Wet Cellulose by Low Temperature Gasification Using a Reduced Nickel Catalyst" 1995 Chemistry Letters pp. 937-938.
Miyazawa, et al., "Glycerol Conversion in the Aqueous Solution under Hydrogen over Ru/C + an Ion-Exchange Resin and Its Reaction Mechanism" 2006 J. of Catalysis 240:213-221.
Nelson, et al., "Application of Direct Thermal Liquefaction for the Conversion of Cellulosic Biomass" 1984 Ind. Eng. Chem. Prod. Res. Dev. 23:471-475.
Oregon Cellulose-Ethanol Study, Appendix B Overview of Cellulose-Ethanol Production Technology 1998 pp. 57-60.
Roman-Leshkov, et al., "Production of Dimethylfuran for Liquid Fuels from Biomass-Derived Carbohydrates" 2007 Nature 447:982-986.
Rostrup-Nielsen, "Conversion of Hydrocarbons and Alcohols for Fuel Cells" 2001 Phys. Chern. Chern. Phys. 3:283-288.
Shabaker, et al., "Aqueous-Phase Reforming of Ethylene Glycol over Supported Platinum Catalysts" 2003 Catal. Lett., vol. 88, Nos. 1-2.
Shabaker, et al., "Aqueous-Phase Reforming of Methanol and Ethylene Glycol Over Alumina-Supported Platinum Catalysts" 2003 Journal of Catalysis 215:344-352.
Shabaker, et al., "Aqueous-Phase Reforming of Oxygenated Hydrocarbons Over Sn-Modified Ni Catalysts" 2004 Journal of Catalysis 222:180-191.
Shabaker, et al., "Sn-modified Ni Catalysts for Aqueous-Phase Reforming: Characterization and Deactivation Studies" 2005 Journal of Catalysis 231:67-76.
Shabaker, et al., "Kinetics of Aqueous-Phase Reforming of Oxygenated Hydrocarbons: Pt/Al2O3 and Sn-Modified Ni Catalysts" 2004 Ind. Eng, Chem. Res., 43:3105-3112.
Silva, et al., "Role of Catalyst Preparation on Determining Selective Sites for Hydrogenation of Dimethyl Adipate Over RuSn/Al2O3," 2006 J. of Molecular Catalysis A: Chemical 253:62-69.
Tsuchida, et al., "Direct Synthesis of n-Butanol from Ethanol over Nonstoichiometric Hydroxyapatite" 2006 Ind. Eng. Chern. Res. 45:8634-8642.
Wang, et al., "Catalytic Steam Reforming of Biomass-Derived Oxygenates: Acetic Acid and Hydroxyacetaldehyde" 1996 Applied Catalysis A: General 143:245-270.
Werpy, et al., "Top Value Added Chemicals from Biomass, vol. 1: Results of Screening for Potential Candidates from Sugars and Synthesis Gas," 2004 National Renewable Energy Laboratory, Pacific Northwest National Laboratory.

\* cited by examiner

METHOD OF PRODUCING GASEOUS PRODUCTS USING A DOWNFLOW REACTOR

CROSS-REFERENCE TO RELATED APPLICATIONS

This application is a divisional patent application of U.S. non-provisional patent application Ser. No. 11/961,280 filed Dec. 20, 2007 now abandoned which claims the benefit of U.S. provisional patent application No. 60/876,015 filed Dec. 20, 2006. The full contents of these applications are incorporated by reference as if set forth in its entirety herein for all purposes.

FEDERALLY SPONSORED RESEARCH OR DEVELOPMENT

This invention was made with United States Government support awarded by the U.S. Department of Energy under DE-FG36-05GO15046. The United States has certain rights in this invention.

BACKGROUND OF THE INVENTION

Many technologies and processes exist for converting feedstocks into liquid or gaseous products using heterogeneous catalyst systems. Such processes are typically categorized based upon whether the feedstock (reactant) and/or product are in a single phase (solid, gas or liquid) or a multi-phase involving two or more of the foregoing. The processes are also categorized based upon the flow pattern in which the feedstock and product flow through the catalyst; namely, either a concurrent configuration where both the feedstock and product flow in the same direction or a countercurrent configuration where the feedstock and product flow across each other in opposite directions. The processes are also typically classified as downflow when the feedstock and product flow down with gravity through the catalyst bed and upflow when the feedstock and product flow up against gravity through the catalyst bed.

The type of reactor system utilized for any given process depends on the nature of the feedstock and its resulting products. For example, concurrent downflow reactors are often used in reactions involving the catalytic conversion of gaseous reactants to gaseous products, or liquid reactants to liquid products, or in trickle bed reactors involving the concurrent flow of both a gas and liquid reactant that react together to produce the desirable product. Concurrent downflow reactors are generally not used for reactions involving the conversion of liquid feedstocks to gas products as the hydrodynamic flow patterns usually become irregular and unpredictable due to the variance between the density and buoyancy of the liquid reactant and the gas phase products. The flow pattern is critical as an irregular or unpredictable flow pattern can lead to vapor-lock and other hydrodynamic problems. In multi-tubular reactor systems, this is significant as vapor-lock and other hydrodynamic problems can lead to mal-distribution of the liquid feedstock or other negative effects (e.g., hot spots, selectivity issues, reactor performance, etc.). Expeditious removal of the gas products from the reactor system is also desirable in order to prevent subsequent, undesired reactions from taking place. As a result, concurrent upflow systems are used in reactions involving the catalytic conversion of a liquid reactant to gaseous products, a process termed flooded flow.

One process which differs from conventional systems is disclosed in European Patent Application No. 88202871.5 (Publication No. 0323663A2) to Terlouw et al. The disclosed process generally relates to controlling the exothermic nature of catalytic reactions between two or more reactants by causing the reactions to occur under substantially isothermic conditions. The reaction mixture includes at least one compound having a boiling point lower than the other compounds in the mixture, and that the one compound is present in an amount sufficient to consume, by vaporization thereof, the heat generated by the exothermic reaction of the mixture. To achieve an isothermic state, the reactor is operated at the boiling pressure of the one compound and in a manner as to provide a concurrent downflow of a liquid and gas phase, wherein the gas phase is the vaporized form of the one compound having the lowest boiling point. The process differs from conventional fixed-bed reactors in that the gas or vapor phase comprises a vaporized component from the liquid phase. The fact that the vapor phase is substantially a vaporized component of the liquid phase is critical to the functionality of the system. Here, vapor-lock and hydrodynamic concerns are limited due to the ability of any vapor trapped within the system to recondense into its liquid form for either continued use or removal from the system.

SUMMARY OF THE INVENTION

The present invention provides a reactor system for converting a liquid feedstock to a noncondensable gas product. The reactor system includes a reaction chamber having at least one reaction tube, with a catalyst packed therein, an inlet disposed above the reaction chamber for introducing the liquid feedstock, and an outlet disposed below the reaction chamber for discharging the noncondensable gas product and an effluent stream. The pressure at the inlet is greater than the pressure at the outlet, thereby causing the liquid feedstock, the noncondensable gas product and the effluent to concurrently flow in a downflow direction. In one embodiment, the system includes a multi-tube reactor containing a plurality of reaction tubes, an outer shell enclosing the reaction tubes, and a heating medium system for introducing a heating medium into the shell. The catalyst is preferably a heterogeneous catalyst having one or more materials capable of producing noncondensable gases under aqueous phase reforming conditions, such as Group VIIIB metals, whether alone or in combination with Group VIIB metals, Group VIB metals, Group VB metals, Group IVB metals, Group IIB metals, Group IB metals, Group IVA metals, or Group VA metals.

The present invention also involves methods for producing synthesis gases, such as hydrogen and light hydrocarbons, and other noncondensable gases from liquid feedstocks. The method includes the steps of (a) introducing at a first pressure a liquid feedstock through an inlet into a reaction chamber; (b) reacting the liquid feedstock over a heterogeneous catalyst at a temperature and pressure effective to produce noncondensable gas and an effluent stream; and (c) removing the noncondensable gas and effluent from the reaction chamber at a second pressure less than the first pressure and in a manner that provides a concurrent downflow of the liquid feedstock, gas and effluent. The liquid feedstock preferably includes water and an oxygenated hydrocarbon having at least two carbon atoms, such as any one of a number of polyols, sugars, sugar alcohols, alcohols, starches, lignins, cellulosics and water soluble saccharides. The catalyst is preferably a heterogeneous catalyst having one or more materials capable of producing noncondensable gases under aqueous phase reforming conditions, such as Group VIIIB metals, whether alone or in combination with Group VIIB metals, Group VIB metals, Group VB metals, Group IVB metals, Group IIB metals, Group IB metals, Group IVA metals, or Group VA metals.

The resulting gases may be used as a fuel source for energy generation via PEM fuel cells, solid-oxide fuel cells, internal combustion engines, or gas turbine gensets, or used in other chemical processes to produce additional products. The gaseous products may also be purified, collected for later use or distributed.

One aspect of the invention is a concurrent downflow reactor for converting a liquid feedstock to a noncondensable gas product using a heterogenous catalyst, the reactor comprising a reaction chamber comprising at least one reaction tube containing a heterogenous catalyst therein; an inlet having a pressure $P_i$ and adapted to feed the liquid feedstock to an upper portion of the reaction chamber; an outlet having a pressure $P_o$ and adapted to discharge the noncondensable gas product and an effluent stream from a lower portion of the reaction chamber, wherein $P_i$ is greater than $P_o$.

In an exemplary embodiment of the reactor, the reaction chamber comprises a plurality of reaction tubes each containing a catalyst therein, an outer shell adapted to enclose at least a portion of the reaction tubes, and a heating system adapted to introduce a heating medium into the shell to provide heat to the reaction tubes.

In another exemplary embodiment of the reactor, the catalyst comprises at least one Group VIIIB metal and wherein the feedstock comprises water and at least one $C_{2+}$ water soluble oxygenated hydrocarbon.

In another exemplary embodiment of the reactor, the Group VIIIB metal is platinum, nickel, palladium, ruthenium, rhodium, iridium, iron, an alloys thereof, or a mixtures thereof, and wherein the oxygenated hydrocarbon is a $C_{2-6}$ oxygenated hydrocarbon.

In another exemplary embodiment of the reactor, the catalyst further comprises a second catalytic material being Group VIIIB metals, Group VIIB metals, Group VIB metals, Group VB metals, Group IVB metals, Group IIB metals, Group IB metals, Group IVA metals, Group VA metals, alloys thereof, or mixtures thereof.

In another exemplary embodiment of the reactor, the second catalytic material is rhenium and the Group VIIIB transition metal is iron, nickel, palladium, platinum, ruthenium, rhodium, alloys thereof, or mixtures thereof.

In another exemplary embodiment of the reactor, the catalyst is adhered to a support constructed from one or more materials being carbon, silica, silica-alumina, alumina, zirconia, titania, ceria, vanadia or mixtures thereof.

In another exemplary embodiment of the reactor, the noncondensable gas product comprises one or more gases being hydrogen, carbon dioxide, carbon monoxide, methane, ethane, ethylene, propane, propylene, butane, butane, pentane and pentene.

Another aspect of the invention is an energy generation system comprising any one of the inventive reactors set forth herein and an energy generation device adapted to use the noncondensable gas product as a fuel.

In an exemplary embodiment of the energy generation system, the energy generation device is an internal combustion engine, PEM fuel cell, solid-oxide fuel cell, or a gas turbine genset.

Another aspect of the invention is a method for manufacture of noncondensable gas using any one of the inventive reactors set forth herein, the method comprising the acts or steps of reacting a liquid feedstock comprising water and at least one $C_{2+}$ water soluble oxygenated hydrocarbon using a heterogeneous catalyst comprising one or more Group VIIIB metals, at a temperature between about 80° C. to 300° C. and a reaction pressure suitable to produce the noncondensable gas and an effluent, wherein a pressure gradient provides concurrent downflow of the liquid feedstock, effluent and noncondensable gas.

In an exemplary embodiment of the method of manufacture, the Group VIIIB metal is platinum, nickel, palladium, ruthenium, rhodium, iridium, iron, alloys thereof, or mixtures thereof.

In another exemplary embodiment of the method of manufacture, the catalyst further comprises a second catalytic material being Group VIIB metals, Group VIB metals, Group VB metals, Group IVB metals, Group IIB metals, Group IB metals, Group IVA metals, Group VA metals, alloys thereof, or mixtures thereof.

In another exemplary embodiment of the method of manufacture, the second catalytic material is rhenium and the Group VIIIB metal is iron, nickel, palladium, platinum, ruthenium, rhodium, alloys thereof, or mixtures thereof.

In another exemplary embodiment of the method of manufacture, the catalyst is adhered to a support constructed from one or more materials being carbon, silica, silica-alumina, alumina, zirconia, titania, ceria, vanadia or mixtures thereof.

In another exemplary embodiment of the method of manufacture, the oxygenated hydrocarbon is a $C_{1-6}$ oxygenated hydrocarbon.

In another exemplary embodiment of the method of manufacture, the oxygenated hydrocarbon is a sugar or a sugar alcohol.

In another exemplary embodiment of the method of manufacture, the reaction temperature is between about 150° C. and about 270° C. and the reaction pressure is between about 72 psig and about 1300 psig.

In another exemplary embodiment of the method of manufacture, the noncondensable gas comprises one or more gases being hydrogen, carbon dioxide, carbon monoxide, methane, ethane, ethylene, propane, propylene, butane, butane, pentane and pentene.

In another exemplary embodiment of the method of manufacture, the pressure gradient is in the range of 0.5-3 psig.

DETAILED DESCRIPTION OF THE EXEMPLARY EMBODIMENTS

The present invention is directed to reactor systems and their use in converting liquid feedstocks to noncondensable gases, such as hydrogen and light hydrocarbons. The reactor systems differ from conventional systems in that the reactor is designed so that the feedstock solution, resulting gas products and any effluent flow in a concurrent downflow direction. The generated gases are useful as a fuel source for energy generation via PEM fuel cells, solid-oxide fuel cells, internal combustion engines, or gas turbine gensets, or used in other chemical processes to produce additional products. The gaseous products may also be purified and collected for later use or distribution.

Figure 1:
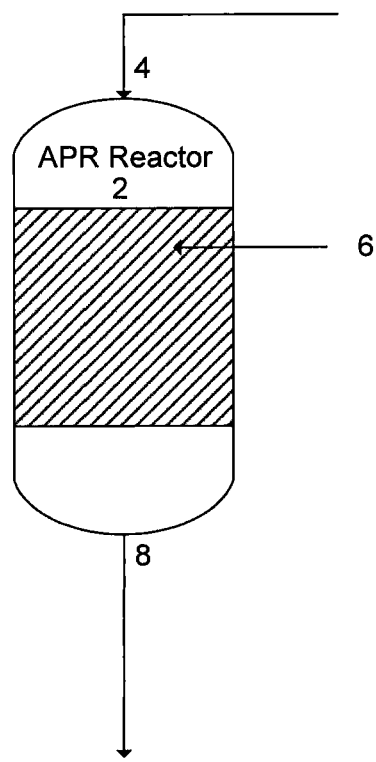
FIG. 1 is an illustration of a single chamber reactor system.

Referring to FIG. 1, an aqueous feedstock solution is introduced into reaction chamber 2 through inlet 4 where it is reacted over a heterogeneous catalyst 6 at a pressure and temperature effective to produce the desirable noncondensable gases and an effluent stream. The noncondensable gases and effluent flow in a concurrent downflow direction to outlet 8 where they are collected and/or transferred for downstream processing or use. The concurrent downflow is achieved by maintaining the pressure ($P_i$) at inlet 4 at a level greater than the pressure ($P_o$) at outlet 8 so as to provide a pressure gradient along the length of the reaction chamber 2. To maximize performance, it is also desirable to maintain a substantially similar pressure across the horizontal plane of the reaction chamber 2 so as to cause equal distribution of the feedstock, gas product and effluent across the reactor and the continuous flow of the gas product through outlet 8.

The reactor system is particularly useful for producing light hydrocarbons (e.g., $C_{1-4}$ parrafins and olefins) and hydrogen from biomass-derived oxygenated hydrocarbons using aqueous phase reforming. Aqueous-Phase Reforming (APR) is a catalytic reforming process that generates light hydrocarbons (e.g. methane, ethane, ethylene, propane, propylene, butane, 1-butene, pentane, 1-pentene, 2-pentene, hexane, etc.), carbon monoxide, carbon dioxide and/or hydrogen by the reaction of oxygenated compounds with liquid water at low temperatures. The key breakthrough of the APR process is that the reforming can be done in the liquid phase and at temperatures (e.g., 150° C. to 270° C.) where the water-gas shift reaction is favorable, thereby making it possible to generate hydrogen with low amounts of CO in a single chemical reactor. In the case of hydrogen production, the reaction also tends to be endothermic, thereby avoiding the concerns associated with exothermic reactions. Various methods and techniques for practicing APR are described in U.S. Pat. Nos. 6,699,457; 6,964,757 and 6,964,758; and U.S. patent application Ser. No. 11/234,727 (all to Cortright et al., entitled "Low-Temperature Hydrogen Production from Oxygenated Hydrocarbons"); and U.S. Pat. No. 6,953,873 (to Cortright et al., and entitled "Low Temperature Hydrocarbon Production from Oxygenated Hydrocarbons"); and commonly owned co-pending International Patent Application No. PCT/US2006/048030 (to Cortright et al., and entitled "Catalyst and Methods for Reforming Oxygenated Compounds"), all of which are incorporated herein by reference.

In addition to aqueous phase reforming, the present invention is also useful in other systems that generate noncondensable gases from liquid feedstocks. Noncondensable gases are generally classified as those gases that exist in the gas phase at standard temperature and pressure. Illustrated examples of various noncondensable gases and their boiling points, critical pressures and critical temperatures are set forth in Table 1 below.

TABLE 1

| Gas | Boiling Point (° C.) | Critical Pressure (psia) | Critical Temp (° C.) |
| --- | --- | --- | --- |
| Hydrogen | −252.8 | 188.1 | −239.9 |
| Carbon Monoxide | −191.5 | 507.4 | −140.02 |
| Carbon Dioxide | −78.4 | 1070.6 | 31 |
| Methane | −161.5 | 673.1 | −82.1 |
| Ethane | −88.6 | 712.8 | 32.4 |
| Propane | −42.1 | 618.7 | 96.8 |
| n-Butane | −0.5 | 550.7 | 152 |
| Ethylene | −103.7 | 742.1 | 9.9 |
| Propylene | −47.7 | 667.1 | 91.8 |
| 1-Butene | −6.3 | 583.4 | 146.4 |
| Nitrogen | −195.8 | 492.2 | −149.9 |
| Oxygen | −183 | 731.4 | 118.6 |
| Helium | −268.9 | 33.2 | −268 |

Figure 7:
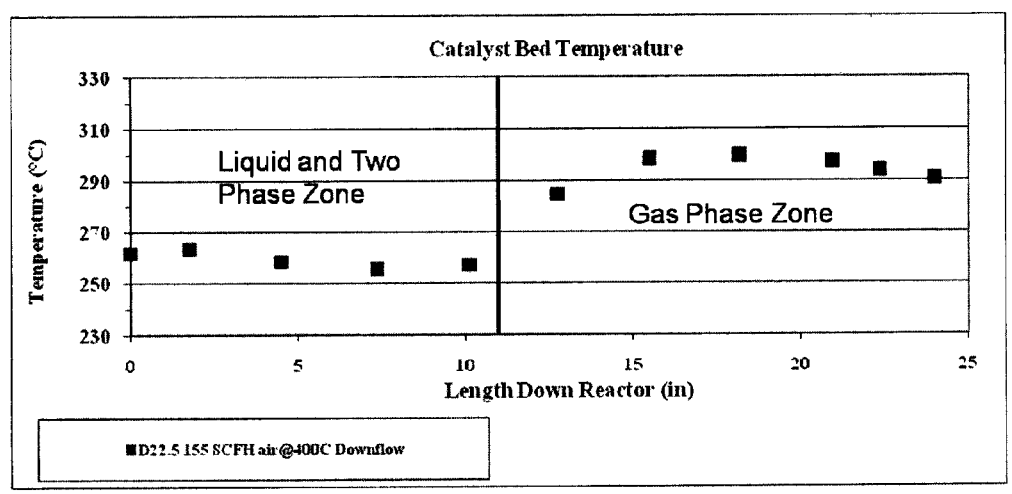
FIG. 7 illustrates the catalyst bed temperature along the length of a single tube reactor during the production of synthesis gas from glycerol.
Figure 8:
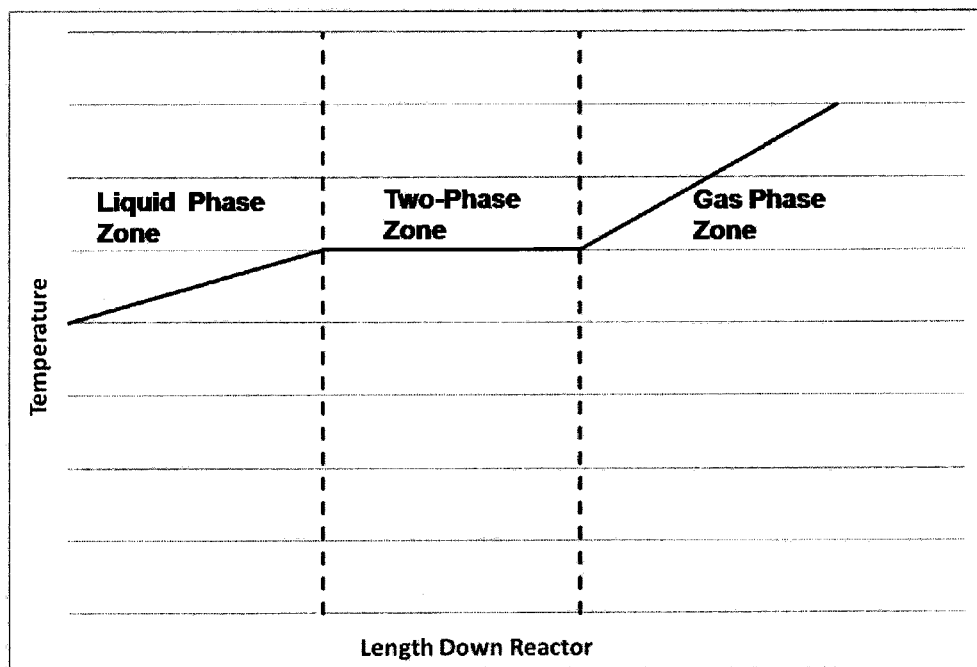
FIG. 8 illustrates the multiphase transition along the length of a reactor.
Figure 9:
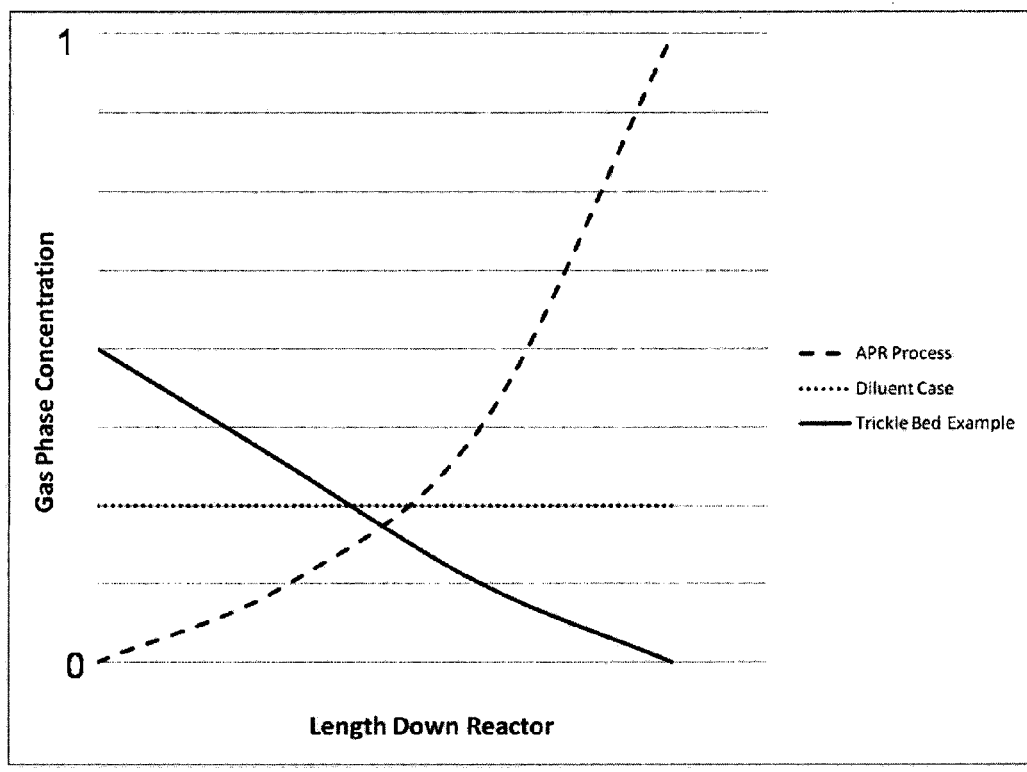
FIG. 9 illustrates the gas concentration gradient for an exemplary embodiment of the present invention as compared to trickle-bed reactor systems, such as that disclosed in EP Application 0323663.

In its operation, the liquid feedstock enters the reaction chamber where it is contacted with the catalyst. As the liquid feedstock continues down the reaction chamber it is catalytically reacted to produce gaseous product and an effluent containing water, unreacted feedstock and any other byproducts. The result is a liquid phase zone in the early portions of the reactor, followed by a two-phase zone containing both gaseous product and effluent, and then, in some applications, a complete conversion to a gas phase as the effluent is vaporized (FIG. 8). The production of the gaseous products results in an increase in the catalyst bed temperature (FIG. 7) and a continued increase in the concentration of gaseous products (FIG. 9) as the reaction commences down the length of the reactor. Contrast that with trickle-bed reactors where the gas reactant is consumed along the length of the reactor such that the gas concentration decreases, or is passed directly through the system as a diluent (FIG. 9).

The present invention differs from conventional technologies in that it makes use of a downflow configuration. A downflow configuration is a non-desirable flow scheme due to the problems of gas removal, vapor lock and mal-distribution of flow, especially as the concentrations of gaseous products increased. If liquid flow diminished or ceased, and a subsequent stall of reaction activity occurred, a heat sink would no longer exist, leading to stagnation and overheating in the system. As such, the downflow configuration is a non-desirable system for producing gaseous products from liquid feedstocks.

The present invention overcomes the vapor lock, flow mal-distribution and gas removal problems by maintaining a substantially similar pressure gradient across the reactor, especially in multi-tube reactors, thereby imparting enough force on the gaseous products to overcome buoyancy. By maintaining a pressure gradient along the length of the reactor, the resulting flow further assists in overcoming stagnation and gas removal issues. The pressure gradient may be of any range so long as the pressure at the inlet is greater than the pressure at the outlet, and may be achieved by considering the throughput of the reactor in conjunction with the main variables of catalyst particle size and length to diameter (L/D) ratio of the reactor.

Unlike reactors systems in which gaseous feedstocks are converted to synthesis gases, and other noncondensable gas products, the present invention involves the conversion of the liquid feedstock directly to the desirable gas product. The conversion in this manner has several benefits as compared to the gas-to-gas systems. Specifically, the present invention does not require the extreme temperatures or system pressures required of gas-based systems. The ability to perform the conversion reactions at lower pressures (typically 15 to 50 bar) also allows for the gas product stream to be more effectively purified and reduces the need for energy consuming pressure systems. The low temperatures also minimize the occurrence of undesirable decomposition reactions typically encountered when carbohydrates are heated to elevated temperatures, thereby allowing for the use of biomass derived feedstocks. The down-flow configuration may also improve the selectivity, stability and efficiency of the process, and advantageously improves the overall conversion of the liquid feedstock to the desirable noncondensable gas products. In terms of scaled-up production, after start-up, the reactor systems could be process controlled, and the reactions would proceed at steady-state.

The use of a liquid feedstock also assists in overcoming the vapor lock, flow mal-distribution and gas removal concerns. For instance, the liquid feedstock simplifies the equal distribution across the reactor system, especially in multi-tube systems, and removes the need for complex elements required in two-phase systems, such as the liquid and gas mixers used in trickle-bed reactors. The single liquid phase at the inlet also serves as a cap or barrier that impedes the buoyant gaseous products produced in the later two-phase portion of the reactor from percolating up to the inlet and disturbing the incoming feedstock distribution.

In one application of the invention, the noncondensable gases are generated from an aqueous feedstock solution containing oxygenated hydrocarbons. The oxygenated hydrocarbons can be any water-soluble oxygenated hydrocarbon having two or more carbon atoms and at least one oxygen atom. Preferably, the oxygenated hydrocarbon has 2 to 12 carbon atoms, and more preferably 2 to 6 carbon atoms. The oxygenated hydrocarbon may also have an oxygen-to-carbon ratio ranging from 0.5:1 to 1.5:1, including ratios of 0.75:1.0, 1.0:1.0, 1.25:1.0, 1.5:1.0, and other ratios there-between. In exemplary embodiments, the oxygenated hydrocarbon has an oxygen-to-carbon ratio of 1:1. Nonlimiting examples of water-soluble oxygenated hydrocarbons include ethanediol, ethanedione, acetic acid, propanol, propanediol, propionic acid, glycerol, glyceraldehyde, dihydroxyacetone, lactic acid, pyruvic acid, malonic acid, butanediols, butanoic acid, aldotetroses, tautaric acid, aldopentoses, aldohexoses, ketotetroses, ketopentoses, ketohexoses, alditols, sugars, sugar alcohols, cellulosic derivatives, lignocellulosic derivatives, saccharides, starches, polyols and the like. In one exemplary embodiment, the oxygenated hydrocarbon includes sugar, sugar alcohol, saccharides and glycerol. More particularly, the oxygenated hydrocarbon is a sugar, such as glucose, fructose, sucrose, maltose, lactose, mannose or xylose, or a sugar alcohol, such as arabitol, erythritol, glycerol, isomalt, lactitol, malitol, mannitol, sorbitol or xylitol.

The oxygenated hydrocarbon is combined with water to provide an aqueous feedstock solution having a concentration effective for conversion to the desirable gaseous products. The water-to-carbon ratio on a molar basis should be from about 0.5:1 to about 20:1, including ratios such as 1:1, 2:1, 3:1, 4:1, 5:1, 6:1, 7:1, 8:1, 9:1, 10:1, 15:1, and any ratios there-between. The feedstock solution may also be characterized as a solution having at least 20 weight percent (wt %) of the total solution as an oxygenated hydrocarbon. For example, the solution may include one or more oxygenated hydrocarbons, with the total concentration of the oxygenated hydrocarbons in the solution being at least about 10%, 20%, 30%, 40%, 50%, 60%, or greater by weight, including any percentages between, and depending on the oxygenated hydrocarbons used. In one exemplary embodiment, the feedstock solution includes at least about 20%, 30%, 40%, 50%, or 60% of a sugar, such as glucose, fructose, sucrose or xylose, or a sugar alcohol, such as sorbitol, mannitol, glycerol or xylitol, by weight.

The temperature and pressure conditions are such that at least a portion of the feedstock is maintained in the liquid phase at the reactor inlet. The temperature and pressure conditions may also be selected to more favorably produce the desirable gaseous products in the vapor-phase. In general, the reaction should be conducted at a temperature where the thermodynamics are favorable. For instance, the minimum pressure required to maintain a portion of the feedstock in the liquid phase will vary with the reaction temperature. As temperatures increase, higher pressures will generally be required to maintain the feedstock in the liquid phase. In terms of scaled-up production, after start-up, the reactor systems could be process controlled, and the reactions would proceed at steady-state equilibrium.

The reaction temperature may be from about 80° C. to about 300° C., and the reaction pressure from about 72 psig to about 1300 psig. In one exemplary embodiment, the reaction temperature is between about 120° C. and about 300° C., or between about 150° C. and about 270° C. The reaction pressure is between about 72 and 1200 psig, or between about 145 and 1200 psig, or between about 200 and 725 psig, or between about 365 and 675 psig.

In general, the reaction should be conducted under conditions where the residence time ($t_r$) of the feedstock solution over the catalyst is appropriate to generate the desirable gaseous products. For example, the WHSV for the reaction may be at least about 0.25 gram of oxygenated hydrocarbon per gram of catalyst per hour, or at least 0.5 grams, or at least 5.0 grams, or at least 10.0 grams, or at least 100.0 grams, or at least 1000.0 grams of oxygenated hydrocarbon per gram of catalyst per hour.

Alkali or alkali earth salts may also be added to the feedstock solution to optimize the proportion of hydrogen in the reaction products. Examples of suitable water-soluble salts include one or more selected from the group consisting of an alkali or an alkali earth metal hydroxide, carbonate, nitrate, or chloride salt. For example, adding alkali (basic) salts to provide a pH of about pH 4.0 to about pH 10.0 can improve hydrogen selectivity.

The heterogeneous catalyst is capable of catalyzing the reaction of water and oxygenated hydrocarbons to form hydrogen and/or hydrocarbons under the conditions described above. The exemplary catalyst includes a nitride, or a carbide or at least one Group VIIIB metal, and any alloy or mixtures thereof. The catalyst may also include a nitride, or a carbide, or at least one Group VIIIB metal, in combination with at least one second metal selected from Group VIIIB, Group VIIB, Group VIB, Group VB, Group IVB, Group IIB, Group IB, Group IVA or Group VA metals. The exemplary Group VIIB metals include rhenium, manganese, or combinations thereof. The exemplary Group VIB metals include chromium, molybdenum, tungsten, or a combination thereof. The exemplary Group VIIIB metals include platinum, rhodium, ruthenium, palladium, nickel, or combinations thereof. Specific illustrative examples include Ni:Pd and Pt:Re.

Preferred loading of the primary Group VIIIB metal is in the range of 0.25 wt % to 25 wt % on carbon, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal is in the range of 0.25-to-1 to 10-to-1, including ratios between, such as 0.50, 1.00, 2.50, 5.00, and 7.50-to-1.

One exemplary catalyst composition is achieved by the addition of oxides of Group IIIB, and associated rare earth oxides. In such event, the components include oxides of either lanthanum or cerium. The atomic ratio of the Group IIIB compounds to the primary Group VIIIB metal may be in the range of 0.25-to-1 to 10-to-1, including ratios between, such as 0.50, 1.00, 2.50, 5.00, and 7.50-to-1.

Another exemplary catalyst composition is one containing platinum and rhenium. The atomic ratio of platinum to rhenium may be in the range of 0.25:1 to 10:1 including ratios there-between, such as 0.50:1, 1.00:1, 2.50:1, 5.00:1, and 7.00:1. The loading of the platinum may be in the range of 0.25 wt % to 5.0 wt %, with weight percentages of 0.10% and 0.05% increments between, such as 0.35%, 0.45%, 0.75%, 1.10%, 1.15%, 2.00%, 2.50%, 3.0%, and 4.0%.

The catalyst systems may also include a support suitable for suspending the catalyst in the feedstock solution. The support should be one that provides a stable platform for the chosen catalyst and the reaction conditions. The support may take any form which is stable at the chosen reaction conditions to function at the desirable levels, and specifically stable in aqueous feedstock solutions. Such supports include, without limitation, carbon, silica, silica-alumina, alumina, zirconia, titania, ceria, vanadia and mixtures thereof. Nanoporous supports such as zeolites, carbon nanotubes, or carbon fullerene may also be used.

One exemplary catalyst support is carbon, especially carbon supports having relatively high surface areas (greater than 100 square meters per gram). Such carbons include activated carbon (granulated, powdered, or pelletized), activated carbon cloth, felts, or fibers, carbon nanotubes or nanohorns, carbon fullerene, high surface area carbon honeycombs, carbon foams (reticulated carbon foams), and carbon blocks. The carbon may be produced via either chemical or steam activation of peat, wood, lignite, coal, coconut shells, olive pits, and oil based carbon. Another support is granulated activated carbon produced from coconuts. In one embodiment, the catalyst system consists of platinum on carbon, with the platinum being further alloyed or admixed with nickel, ruthenium, copper, iron, or rhenium.

Another exemplary catalyst support is zirconia. The zirconia may be produced via precipitation of zirconium hydroxide from zirconium salts, through sol-gel processing, or any other method. The zirconia may be present in a crystalline form achieved through calcination of the precursor material at temperatures exceeding 400° C. and may include both tetragonal and monoclinic crystalline phases. A modifying agent may also be added to improve the textural or catalytic properties of the zirconia. Modifying agents include, without limitation, sulfate, tungstenate, phosphate, titania, silica, and oxides of Group IIIB metals, especially cerium, lanthanum, or yttrium. In one embodiment, the catalyst system consists of platinum on a primarily tetragonal phase silica modified zirconia, with the platinum being further alloyed or admixed with nickel, ruthenium, copper, iron, or rhenium.

Another exemplary catalyst support is titania. The titania may be produced via precipitation from titanium salts, through sol-gel processing, or any other method. The titania may be present in a crystalline form and include both anatase and rutile crystalline phases. A modifying agent may also be added to improve the textural or catalytic properties of the titania. Such modifying agents include, without limitation, sulfate, silica, and oxides of Group IIIB metals, especially cerium, lanthanum, or yttrium.

Another exemplary catalyst support is silica. The silica may be optionally combined with alumina to form a silica-alumina material. In one embodiment, the catalyst system is platinum on silica-alumina or silica, with the platinum being further alloyed or admixed with nickel, ruthenium, copper, iron or rhenium. In another embodiment, the catalyst system is nickel on silica-alumina or silica, with the nickel being further alloyed or admixed with copper, rhenium, ruthenium or iron.

The support may also be treated or modified to enhance its properties. For example, the support may be treated, as by surface-modification, to modify surface moieties, such as hydrogen and hydroxyl. Surface hydrogen and hydroxyl groups can cause local pH variations that affect catalytic efficiency. The support may also be modified, for example, by treating it with sulfates, phosphates, tungstenates, and silanes. For carbon supports, the carbon may be pretreated with steam, oxygen (from air), inorganic acids or hydrogen peroxide to provide more surface oxygen sites. The pretreated carbon may also be modified by the addition of oxides of Group IVB and Group VB, such as the oxides of titanium, vanadium, zirconium and mixtures thereof.

The catalyst systems, whether alone or mixed together, may be prepared using conventional methods known to those skilled in the art. Such methods include incipient wetting, evaporative impregnation, chemical vapor deposition, wash-coating, magnetron sputtering techniques, and the like. The method chosen to fabricate the catalyst is not particularly critical to the function of the invention, with the proviso that different catalysts will yield different results, depending upon considerations such as overall surface area, porosity, etc.

Figure 2:
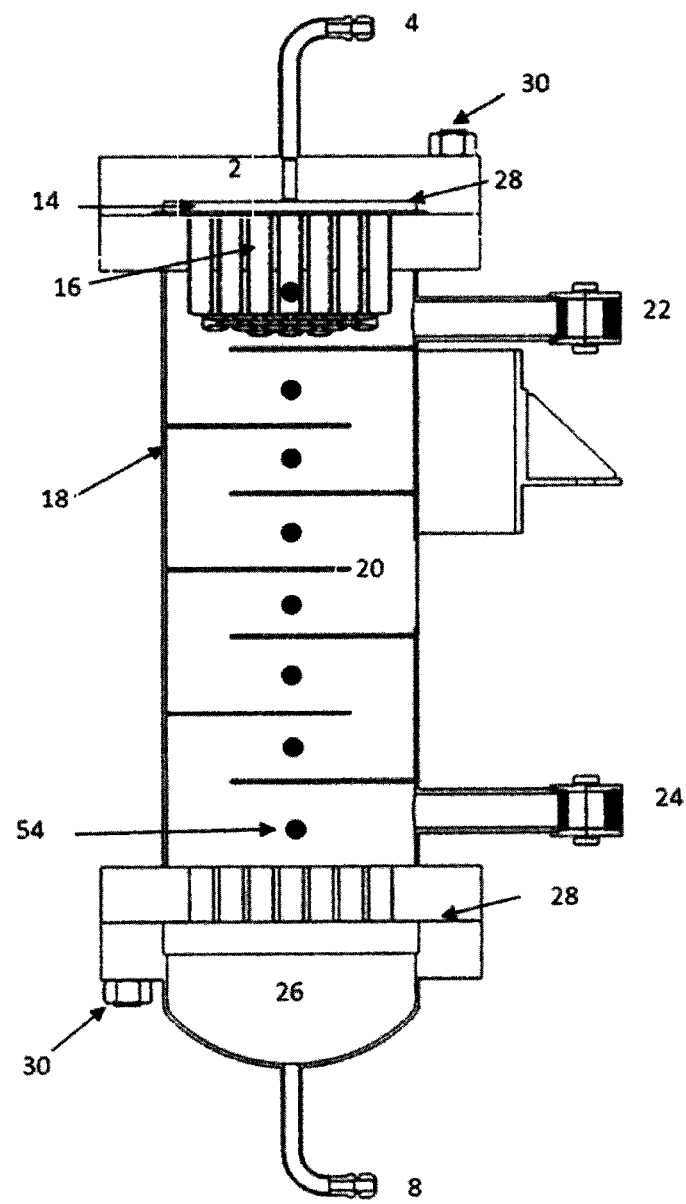
FIG. 2 is a schematic of an exemplary multi-tube reactor system.
Figure 3:
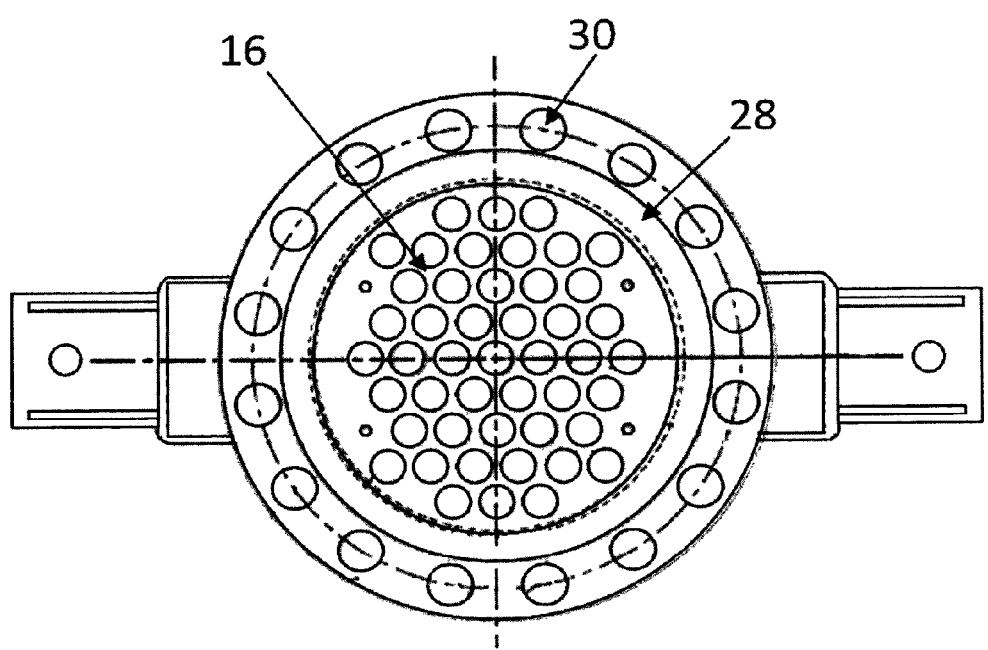
FIG. 3 is a top view of an exemplary multi-tube reactor system.

FIGS. 2 and 3 provide a detailed schematic of one reactor system useful in practicing the present invention. Although a multi-tube reactor system is illustrated, it is recognized that the present invention may also be practiced in reactor systems having a single reaction vessel or in other configurations utilizing other multiple reaction vessels.

Referring to FIG. 2, a liquid feedstock is introduced at the inlet 4 to a reactor 2 containing reaction tubes 16 packed with catalyst and having an outer shell region defined by an exterior housing 18. The liquid feedstock enters an open plenum (not shown) where a distribution plate 14 resides to distribute the liquid feedstock into the multiple reactor tubes 16. As illustrated in FIG. 3, the liquid feedstock is isolated to flow only to the reactor tubes 16 as a result of a gasket on the seal surface 28, which is compressed by bolts through bolt holes 30. The sealed environment has the additional benefit of facilitating the equal distribution of the liquid feedstock across all of the reactor tubes, thereby assisting in maintaining an equal pressure distribution across the reactor system. Once in the reactor tubes 16, the liquid feedstock flows through the catalyst where it reacts to form the noncondensable gas and effluent stream. The gas product and effluent collect in the hemi-spherical collection area 26 prior to exiting through the outlet port 8.

A heating medium is introduced into the external shell 18 to provide process heat to the reactor system. The heating medium can be of any kind typically used in heat exchange reactors, and may vary based on the specific aspects of the desirable reaction and the heat exchange mechanism employed. The medium may be either gas, liquid or solid, and may include, without limitation, exhaust from the system, air, steam, heating oil, molten salt, sand, water, etc.

In this illustration, the shell 18 contains internal features 20 to enhance the flow characteristics of the heating medium. The heating media enters at 22 and exits the system at 24, but may flow through the shell region 18 in a co-current or counter current direction as each flow pattern has its advantage depending upon the feedstock, catalysts and general energy requirements of the system as a whole. The shell may also have side ports 54, whereby exhaust gases from an energy generation apparatus flow at cross-current to the reaction mixture in the reactor tubes 16. The shell may also be vertically segmented and a plurality of inlet and outlet ports provided, whereby more precise temperature control may be achieved by introducing heating mediums of various temperatures through the segments.

The noncondensable gas product may be purified and separate for its intended purpose or feed directly into an associated downstream process. For instance, the gas product may be feed directly into a combustion engine. The presence of $H_2$ and $CO_2$ in fuel gases has shown to have a beneficial effect on combustion in internal combustion engines. Hydrogen is a particular beneficial additive as it has a wide flammability range with fast flame speeds respective to other hydrocarbon fuels. The addition of $H_2$ to traditional hydrocarbon fuels has also shown an extension to the lean-burn of combustion, which provides a higher air to fuel ratio, lower combustion temperatures and a decrease in nitrogen oxide (NOx) emissions. Carbon dioxide, which is present in APR gas, has also been used in exhaust gas recycle (EGR) to reduce the combustion temperature which, in turn, can lower nitrogen oxides (NOx) emissions.

For certain applications, it may also be desirable to first purify the product stream to isolate the noncondensable gas product. The elevated pressure at which the reactor operates also provides a synergistic result when used in conjunction with a gas purification device, such as a PSA or a membrane. Purifications systems are well known in the art and include various phase separators, membranes and gas distillation columns. For example, a phase separator may be employed to collect the hydrogen for further use in downstream processes, such as various chemical reactions that make use of hydrogen as a reactant. In other embodiments, a separation membrane may be employed to purify the gas stream to capture the hydrogen for use directly in hydrogen applications, such as for use in hydrogen fuel cells.

The elevated pressure at which the reactor operates also provides a synergistic result when used in conjunction with an energy generation device, such as an internal combustion engine or fuel cell. With a high level of gaseous or high boiling hydrocarbons in the hydrocarbon mix, the entry pressure for the device should be between about 2 and 120 psig. If the reactor system pressure is higher than the desirable feed pressure, the pressure can be reduced to the desirable, but still elevated, pressure.

Figure 4:
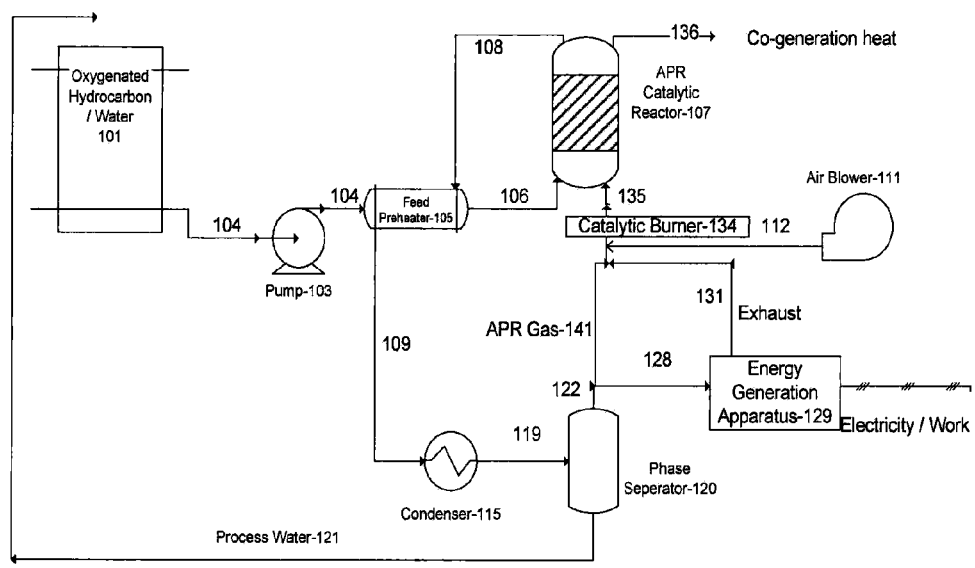
FIG. 4 is a basic system schematic of an exemplary embodiment of a single chamber reactor system in combination with an energy generation apparatus or machine.
Figure 5:
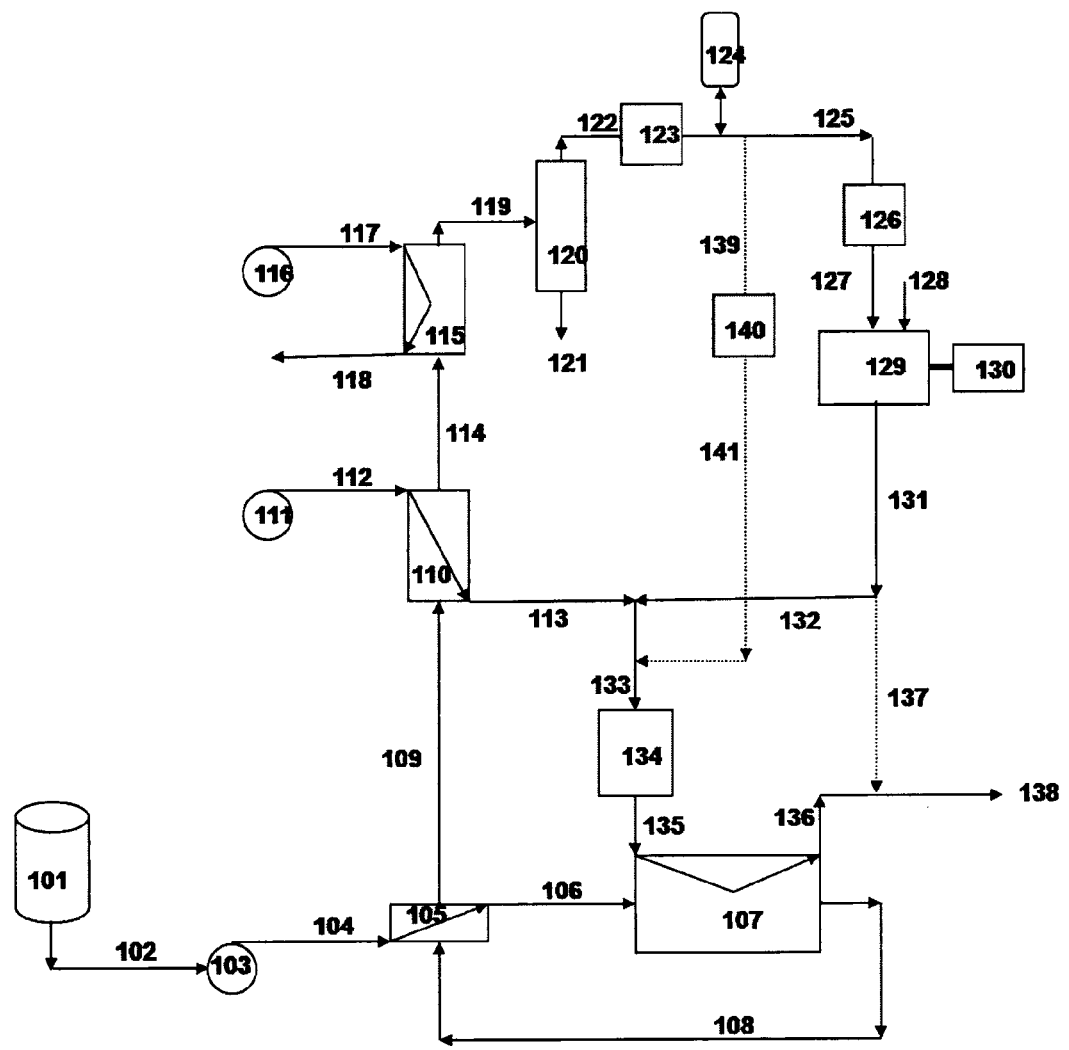
FIG. 5 is a block diagram illustrating a reactor system according to one exemplary embodiment integrated.

Referring to FIG. 4 and particularly to FIG. 5, a feed tank 101 storing a mixture of oxygenated compounds and water feeds a charge pump 103 through a feed line 102. The charge pump 103 increases the pressure of the liquid feedstock solution to the desirable reaction pressure in the reactor system 107. The discharge 104 of the charge pump 103 feeds into a pre-heat exchanger 105 that extracts heat from the reactor effluent to heat the liquid feed that is fed through line 106 to reactor 107 having reactor tube(s) 107a and shell 107b. The reactor tubes 107a are packed with the desirable catalysts, which may be homogenously mixed or sequentially packed.

Hot effluent gas 135 from the catalytic burner 134 is directed to the shell region 107b of the reactor 107 to heat the reactor tubes 107a to the desirable temperature. The reactor effluent containing the reaction products passes through line 108 and into the reactor pre-heat exchanger 105 and is then sent through line 109 to a heat recuperator 110 that heats the excess combustion air 113 to the burner 134. A blower 111 provides the necessary combustion air to the recuperator through line 112. The cooled reactor effluent (line 114) is then further cooled utilizing a liquid cooled heat exchanger 115. The cooling liquid for this system is provided via a recirculation pump 116 that feeds cooling liquid to the heat exchanger 117. The resulting heated liquid leaves the heat exchanger 117 through line 118.

The cooled reactor effluent 119 containing the noncondensable gas product and liquid water are sent to a water-vapor separator 120. The water level in this separator is monitored utilizing a level sensor (not shown) that sends a signal to a level controller that controls a valve on the separator effluent line 121. The vapor-phase product exits the water-vapor separator via line 122. The pressure of the separator 120 and upstream of the reactor 107 is controlled via a mechanical back pressure regulator 123 on line 122. The gas is then sent to a set of surge tanks 124 which allow for storage of the gaseous reactor products and to allow for buffering in the event of system changes.

In the case illustrated in FIG. 5, an internal combustion engine (ICE) 129 is employed to use the gas products as a fuel for generating energy. The noncondensable gas travels through line 125 to a forward pressure regulator 126 that reduces the pressure to that required to supply the ICE 129. The gas is mixed with ambient air from line 128 and combusted to cause the engine to turn an electrical generator 130 which produces electricity. In another embodiment, the ICE 129 may also be connected to a drive shaft that directly runs associated machinery.

In the illustrated embodiment, the combustion exhaust product from the engine 129 travels through line 131 and is diverted around the system by way of line 137 and 138 to the outside atmosphere. Alternatively, the exhaust gas may also be diverted into line 132 where it mixes with preheated blower air in line 113. The exhaust and air gas mixture then passes over the catalytic burner 134. If additional heat is required for the reactor 107, additional gas can be sent to the catalytic burner 134 from the surge tanks 124 via the control valve 140.

EXAMPLES

The following examples are to be considered illustrative of various aspects of the invention and should not be construed to limit the scope of the invention, which are defined by the appended claims.

Example 1

Figure 6:
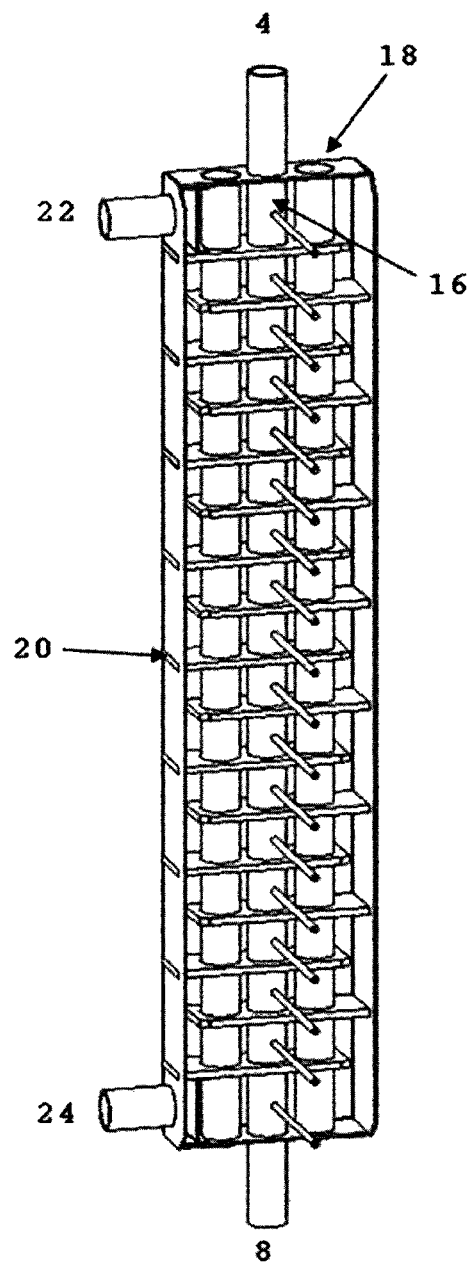
FIG. 6 is an illustration of the single tube reactor system used in Example 1.

A single reactor system was used to compare the effect of flow patterns (upflow versus downflow) on the efficiency and conversion of a feedstock to a gas product. A single reactor system (as illustrated in FIG. 6) was loaded with approximately 140 grams of a 5% Pt Pt:Re 0.25 catalyst on a Calgon 206 CAT P 80×120 (1031-023-1) support. The reactor tube had an outside diameter of 1 inch and a total length of approximately 24 inches. An aqueous feedstock solution of glycerol (32.6 wt % glycerol to water) was fed into the reactor at a weight hourly space velocity (WHSV) of 1.0 gram of glycerol per gram of catalyst per hour. The reaction conditions were set at 625 psig and 250° C. (preheater) with a co-current heating medium air flow of 400° C. The pressure gradient from the inlet to the outlet ranged from 1 psig to 2.5 psig. FIG. 7 illustrates the catalyst bed temperature along the length of the reactor for a single downflow condition.

TABLE 2

Performance improvement due to downflow reactor configuration

| Experiment | Reactor Operating Temperature (° C.) | Conversion to Gaseous Products (%) | Efficiency (%) |
|---|---|---|---|
| Downflow | 260 | 60 | 40 |
| Upflow | 260 | 52 | 20 |
| Downflow | 270 | 90 | 60 |
| Upflow | 270 | 85 | 52 |

As shown in Table 2, the downflow configuration shows higher conversion to gaseous products and higher efficiencies, especially at the lower temperature. As illustrated in Table 3, the downflow configuration also shows stability enhancement on the conversion to gaseous products and efficiency over time. The conversion to gaseous products is defined as the molar ratio of carbon in the gaseous product stream to carbon fed to the system over the same time period. Process efficiency is defined as a ratio of the product of the flow rate and lower heating value of the gaseous product stream to the rate of heat imparted to the catalytic reactor.

The data in Table 3 shows the reactor performance after a month of operation. As can be seen, a marked enhancement in stability is evident during downflow operation with respect to the conversion to gaseous products and efficiency.

TABLE 3

Performance of upflow and downflow configurations over time

| Day | Flow orientation | Conversion to gaseous products (%) | Efficiency (%) |
|---|---|---|---|
| 27 | Upflow | 60 | 48 |
| 34 | Upflow | 50 | 18 |
| 36 | Upflow | 45 | 28 |
| 37 | Downflow | 59 | 60 |
| 38 | Downflow | 57 | 60 |
| 39 | Downflow | 57 | 58 |

Example 2

A downflow multi-tube reactor system as illustrated in FIGS. 2 and 3 was used to generate synthesis gas from glycerol. The reactor system included 47 reactor tubes loaded with a combined total of approximately 6,460 grams of a 5% Pt Pt:Re 0.50 catalyst on a Calgon 206 CAT P 80×120 support. The reactor tubes had an outside diameter of 1 inch and a total catalyst filled length of approximately 24 inches. An aqueous feedstock solution of glycerol (36.2 wt % glycerol to water) was fed into the reactor at a WHSV of 0.5 to 1.0 gram of glycerol per gram of catalyst per hour. The reaction conditions were set at 600 psig and 250° C. (preheater). A co-current heating medium air flow was supplied at an airflow rate of 90 SCFM and a temperature varying from approximately 350° C. to 415° C. depending on conditions. The pressure gradient from the inlet to the outlet across the reactor ranged from approximately 0.5 to 3 psig.

Performance of the system and comparative data from a similarly operated single tube reactor are shown below in Table 4. The performance of the multi-tube reactor is indistinguishable from that of the single tube reactor used in Example 1, loaded with the same 5% Pt Pt:Re 0.5 catalyst and operated at similar conditions, with respect to the conversion to hydrogen and light hydrocarbons and hydrogen yield in the downflow configuration, indicating that the downflow configuration has little or no adverse effect on flow distribution in a multi-tubular reactor. Hydrogen yield is defined as a ratio of the amount of hydrogen in the product stream to the amount that would be present if the reaction had proceeded with stoichiometric selectivity to hydrogen.

TABLE 4

Single tube and multi-tube reactor performance comparison

| Reactor | Conversion to gas (%), WHSV 1 | Conversion to gas (%), WHSV 0.8 | Conversion to gas (%), WHSV 0.5 | Hydrogen yield (%), WHSV 1 | Hydrogen yield (%), WHSV 0.8 | Hydrogen yield (%), WHSV 0.5 |
|---|---|---|---|---|---|---|
| Single tube | 93 to 94 | 85 to 91 | 94 to 98 | 43 to 47 | 44 to 50 | 45 to 48 |
| Multi-tube | 94 to 96 | 87 to 91 | 93 to 96 | 43 to 45 | 39 to 46 | 46 to 48 |

We claim:

1. A method for the manufacture of noncondensable gas, the method comprising:
   reacting a liquid feedstock comprising water and at least one $C_{2+}$ water soluble oxygenated hydrocarbon using a heterogeneous catalyst comprising one or more Group VIIIB metals, at a temperature between about 80° C. to 300° C. and a reaction pressure suitable to produce the noncondensable gas and an effluent, wherein a pressure gradient provides concurrent downflow of the liquid feedstock, effluent and noncondensable gas.

2. The method of claim 1, wherein the Group VIIIB metal is selected from the group consisting of platinum, nickel, palladium, ruthenium, rhodium, iridium, iron, alloys thereof, and mixtures thereof.

3. The method of claim 1, wherein the catalyst further comprises a second catalytic material selected from the group consisting of Group VIIB metals, Group VIB metals, Group VB metals, Group IVB metals, Group IIB metals, Group IB metals, Group IVA metals, Group VA metals, alloys thereof, and mixtures thereof.

4. The method of claim 3 wherein the second catalytic material is rhenium and the Group VIIIB metal is selected from the group consisting of iron, nickel, palladium, platinum, ruthenium, rhodium, alloys thereof, and mixtures thereof.

5. The method of claim 1 wherein the catalyst is adhered to a support constructed from one or more materials selected from the group consisting of carbon, silica, silica-alumina, alumina, zirconia, titania, ceria, vanadia and mixtures thereof.

6. The method of claim 1, wherein the oxygenated hydrocarbon is a $C_{2-6}$ oxygenated hydrocarbon.

7. The method of claim 6, wherein the oxygenated hydrocarbon is a member selected from the group consisting of sugar and sugar alcohol.

8. The method of claim 1, wherein the reaction temperature is between about 150° C. and about 270° C. and the reaction pressure is between about 72 psig and about 1300 psig.

9. The method of claim 1, wherein the noncondensable gas comprises one or more gases selected from the group consisting of hydrogen, carbon dioxide, carbon monoxide, methane, ethane, ethylene, propane, propylene, butane, butane, pentane and pentene.

10. The method of claim 1, wherein the pressure gradient is in the range of 0.5-3 psig.

11. The method of claim 1, wherein reacting the liquid feedstock to produce the noncondensable gas and an effluent occurs in a concurrent downflow reactor having a reaction chamber.

12. The method of claim 11, further comprising the steps of:
feeding the liquid feedstock at an inlet disposed at an upper portion of the reaction chamber; and
discharging the noncondensable gas product and an effluent stream at an outlet at a lower portion of the reaction chamber.

13. The method of claim 12, wherein the pressure at the inlet is greater than the pressure at the outlet.

14. The method of claim 11, wherein the reaction chamber includes a reaction tube and the reaction tube contains the heterogeneous catalyst therein.

15. The method of claim 14, wherein the reaction tube includes an outer shell that encloses at least a portion of the reaction tube and the reaction chamber further comprises a heating system that introduces a heating medium into the outer shell that heats the reaction tube.

16. A method for the manufacture of noncondensable gas, the method comprising:
reacting a liquid feedstock comprising water and at least one $C_{2+}$ water soluble oxygenated hydrocarbon, at a temperature and a reaction pressure suitable to produce the noncondensable gas and an effluent, wherein a pressure gradient provides concurrent downflow of the liquid feedstock, effluent and noncondensable gas.

17. The method of claim 16, wherein the catalyst is a heterogeneous catalyst comprising one or more Group VIIIB metals selected from the group consisting of platinum, nickel, palladium, ruthenium, rhodium, iridium, iron, alloys thereof, and mixtures thereof.

18. The method of claim 16, wherein, during reacting, the temperature is between about 80° C. to 300° C.

19. The method of claim 16, wherein the reacting of the liquid feedstock to produce the noncondensable gas and the effluent occurs in a concurrent downflow reactor and, during the step of reacting the method further comprises the step of transporting the liquid feedstock and noncondensable gas product concurrently downward through the concurrent downflow reactor.

* * * * *